United States Patent
Karczewicz et al.

(10) Patent No.: US 9,609,357 B2
(45) Date of Patent: *Mar. 28, 2017

(54) NON-ZERO ROUNDING AND PREDICTION MODE SELECTION TECHNIQUES IN VIDEO ENCODING

(71) Applicant: QUALCOMM Incorporated, San Diego, CA (US)

(72) Inventors: Marta Karczewicz, San Diego, CA (US); Peisong Chen, San Diego, CA (US); Yan Ye, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/880,500

(22) Filed: Oct. 12, 2015

(65) Prior Publication Data

US 2016/0037181 A1 Feb. 4, 2016

Related U.S. Application Data

(63) Continuation of application No. 12/499,990, filed on Jul. 9, 2009, now Pat. No. 9,161,057.

(51) Int. Cl.
*H04N 7/12* (2006.01)
*H04N 11/02* (2006.01)
(Continued)

(52) U.S. Cl.
CPC ......... *H04N 19/577* (2014.11); *H04N 19/105* (2014.11); *H04N 19/124* (2014.11);
(Continued)

(58) Field of Classification Search
CPC .................................................. H04N 19/1577
(Continued)

(56) References Cited

U.S. PATENT DOCUMENTS

| 8,711,930 B2 | 4/2014 | Karczewicz et al. |
| 8,995,526 B2 | 3/2015 | Karczewicz et al. |

(Continued)

FOREIGN PATENT DOCUMENTS

| CN | 101208958 A | 6/2008 |
| JP | 2004538691 A | 12/2004 |

(Continued)

OTHER PUBLICATIONS

Bordes et al, "JCT-VC AHG Report: Weighted Prediction (AHG18)," 6th Meeting: Torino, IT, Jul. 14-22, 2011, JCTVC-F018, pp. 1-2.

(Continued)

*Primary Examiner* — Jeremaiah C Hallenbeck-Huber
(74) *Attorney, Agent, or Firm* — John Rickenbrode

(57) ABSTRACT

In one aspect of this disclosure, rounding adjustments to bi-directional predictive data may be purposely eliminated to provide predictive data that lacks any rounding bias. In this case, rounded and unrounded predictive data may both be considered in a rate-distortion analysis to identify the best data for prediction of a given video block. In another aspect of this disclosure, techniques are described for selecting among default weighted prediction, implicit weighted prediction, and explicit weighted prediction. In this context, techniques are also described for adding offset to prediction data, e.g., using the format of explicit weighted prediction to allow for offsets to predictive data that is otherwise determined by implicit or default weighted prediction.

14 Claims, 7 Drawing Sheets

(51) Int. Cl.
  H04N 11/04      (2006.01)
  H04N 19/577     (2014.01)
  H04N 19/105     (2014.01)
  H04N 19/147     (2014.01)
  H04N 19/46      (2014.01)
  H04N 19/61      (2014.01)
  H04N 19/573     (2014.01)
  H04N 19/124     (2014.01)
  H04N 19/176     (2014.01)
  H04N 19/44      (2014.01)
  H04N 19/91      (2014.01)

(52) U.S. Cl.
  CPC ......... *H04N 19/147* (2014.11); *H04N 19/176* (2014.11); *H04N 19/44* (2014.11); *H04N 19/46* (2014.11); *H04N 19/573* (2014.11); *H04N 19/61* (2014.11); *H04N 19/91* (2014.11)

(58) Field of Classification Search
  USPC .................................................... 375/240.15
  See application file for complete search history.

(56) References Cited

U.S. PATENT DOCUMENTS

| | | | |
|---|---|---|---|
| 9,161,057 | B2 | 10/2015 | Karczewicz et al. |
| 2004/0062307 | A1 | 4/2004 | Hallapuro et al. |
| 2004/0233995 | A1 | 11/2004 | Abe et al. |
| 2005/0123274 | A1 | 6/2005 | Crinon et al. |
| 2005/0123374 | A1 | 6/2005 | Thorning |
| 2005/0259736 | A1 | 11/2005 | Payson |
| 2006/0093038 | A1 | 5/2006 | Boyce |
| 2006/0146932 | A1 | 7/2006 | Panusopone et al. |
| 2006/0268166 | A1 | 11/2006 | Bossen et al. |
| 2006/0291557 | A1 | 12/2006 | Tourapis et al. |
| 2006/0291562 | A1 | 12/2006 | Lee et al. |
| 2007/0223581 | A1 | 9/2007 | Iguchi |
| 2008/0089404 | A1 | 4/2008 | Okazaki et al. |
| 2008/0225946 | A1 | 9/2008 | Yin et al. |
| 2008/0253456 | A1 | 10/2008 | Yin et al. |
| 2009/0010330 | A1 | 1/2009 | Tourapis et al. |
| 2009/0087111 | A1 | 4/2009 | Noda et al. |
| 2009/0129474 | A1 | 5/2009 | Pandit et al. |
| 2009/0168886 | A1 | 7/2009 | Ikeda et al. |
| 2009/0279608 | A1 | 11/2009 | Jeon et al. |
| 2010/0086027 | A1 | 4/2010 | Panchal et al. |
| 2011/0007799 | A1 | 1/2011 | Karczewicz et al. |
| 2011/0007803 | A1 | 1/2011 | Karczewicz et al. |

FOREIGN PATENT DOCUMENTS

| | | | |
|---|---|---|---|
| JP | 2005533467 | A | 11/2005 |
| JP | 2006513592 | A | 4/2006 |
| JP | 2007019995 | A | 1/2007 |
| JP | 2007525072 | A | 8/2007 |
| JP | 2008541502 | A | 11/2008 |
| JP | 2008312266 | A | 12/2008 |
| JP | 2009512347 | A | 3/2009 |
| JP | 2013246786 | A | 12/2013 |
| KR | 20070000022 | A | 1/2007 |
| WO | 03007119 | A2 | 1/2003 |
| WO | 2004004310 | A2 | 1/2004 |
| WO | 2004008762 | A1 | 1/2004 |
| WO | 2005004492 | A2 | 1/2005 |
| WO | 2006128072 | A2 | 11/2006 |
| WO | 2007047271 | A2 | 4/2007 |
| WO | 2007092215 | | 8/2007 |
| WO | 2007092215 | A2 | 8/2007 |
| WO | 2007116551 | A1 | 10/2007 |
| WO | 2008004940 | A1 | 1/2008 |
| WO | 2009017301 | A1 | 2/2009 |
| WO | 2009054347 | A1 | 4/2009 |

OTHER PUBLICATIONS

Bordes, "Weighted Prediction," 5th Meeting: Geneva, CH, Mar. 16-23, 2011, JCTVC-E041r2, 9 pages.
Bordes, "Weighted Prediction," 6th Meeting: Torino, IT, Jul. 14-22, 2011, JCTVC-F265, pp. 1-14.
Bossen, "Common test conditions and software reference configurations," JCTVC-F900, ITU-T SG16 WP3 and ISO/IEC JTC1/SC29/WG11, 6th Meeting: Torino, IT, Jul. 14-22, 2011, 3 pages.
Boyce: "Adaptive ref. picture weighting using ref. pic. index" Joint Video Team (JVT) of ISO/IEC MPEG & ITU-T VCEG(ISO/IEC JTC1/SC29/WG11 and ITU-T SG16 Q6), XX, XX, No. JVT-D122, Jul. 26, 2002 (Jul. 26, 2002), XP030005394 p. 11, line 12-line 21.
Boyce J, "Adaptive Reference Picture Weighting Using Reference Picture Index," 4th Meeting: Klagenfurt, Austria, Jul. 22-26, 2002, JVT-D122, 7 Pages.
Boyce J, "Changes to Adaptive Reference Picture Weighting," 5th Meeting: Geneva, CH, Oct. 9-17, 2002, JVT-E060, 7 pages.
Boyce J, "Weighted Prediction Clean-up," 6th Meeting: Awaji, Island, JP, Dec. 5-13, 2002, JVT-F034, 7 pages.
Boyce J.M., "Weighted prediction in the H.264/MPEG AVC coding standard", Circuits and Systems, 2004, ISCAS 04, Proceedings of the 2004 International Symposium on, May 23, 2004 (May 23, 2004), pp. III-789, XP010719383 ISBN : 978-0-7803-8251-0.
Bramer B., "Errors in numerical computation", Apr. 4, 2002, available at https://web.archive.org/web/20020404064343/http://www.cse.dmu.ac.uk/~bb/Teaching/ComputerSystems/ErrorsInComputation/ErrorsInComputation.htm.
Ellinas J N, et al., "Stereo video coding based on quad-tree decomposition of B-P frames by motion and disparity interpolation" IEE Proceedings: Vision, Image and Signal Processing, Institution of Electrical Engineers, GB LNKDDOI: 10.1049/IP-VIS:20045033, vol. 152, No. 5, Oct. 7, 2005 (Oct. 7, 2005), pp. 639-647, XP006024995 ISSN: 1350-245X p. 642, paragraph 3.2-p. 643.
Information Technology—Coding of Audio-Visual Objects—Part 10: Advanced Video Coding, ISOnEC 14496-10:2005.
International Preliminary Report on Patentability—PCT/US2009/050332, The International Bureau of WIPO—Geneva, Switzerland, Aug. 29, 2011.
International Preliminary Report on Patentability—PCT/US2010/041423, The International Bureau of WIPO—Geneva, Switzerland, Jul. 29, 2011.
International Search Report & Written Opinion—PCT/US2009/050332, International Search Authority—European Patent Office—Apr. 14, 2010.
International Search Report and Written Opinion—PCT/US2010/041422, International Search Authority—European Patent Office—Oct. 21, 2010.
International Search Report and Written Opinion—PCT/US2010/041423, International Search Authority—European Patent Office—Oct. 21, 2010.
ITU VCEG, "Draft Requirements for next-generation video coding project" 38th Meeting: London, UK, Jul. 1-8, 2009, VCEG-AI96, 4 pages.
ITU-T H.263, Series H: Transmission of Non-Telephone Signals, Video Coding for Low Bit Rate Communication, The International Telecommunication Union. Mar. 1996, 52 pages.
ITU-T H.264, Series H: Audiovisual and Multimedia Systems, Infrastructure of audiovisual services—Coding of moving video, Advanced video coding for generic audiovisual services, The International Telecommunication Union. Jan. 2012, 680 pages.
ITU-T H.264, Series H: Audiovisual and Multimedia Systems, Infrastructure of audiovisual services—Coding of moving video, Advanced video coding for generic audiovisual services, The International Telecommunication Union. May 2003, 282 pages.
ITU-T H.265, Series H: Audiovisual and Multimedia Systems, Infrastructure of audiovisual services—Coding of moving video, High efficiency video coding, The International Telecommunication Union, Apr. 2013, 317 pages.

(56) References Cited

OTHER PUBLICATIONS

Jeon B. M., et al., "B pictures in JVT", joint Video Team (JVT) of ISO/IEC MPEG & ITU-T VCEG (ISO/IEC JTC1/SC29/WG11 and ITU-T SG16 Q.6), 4th Meeting: Klagenfurt, Austria, Jul. 2002, JVT-D155, pp. 1-19.

Kadono: "Implicit Weighted Bi-prediction using DC Offset" ITU Study Group 16—Video Coding Experts Group—ISO/IEC MPEG & ITU-T VCEG(ISO/IEC JTC1/SC29/WG11 and ITU-T SG16 Q6), XX, XX, No. JVT-E077, Oct. 18, 2002 (Oct. 18, 2002), XP030005494.

Kamp S, et al., "Error accumulation in motion comp i n P and B slices" 27. JVT Meeting; Jun. 4, 2008-Oct. 4, 2008; Geneva, (Joint Video Team of ISO/IEC JTC1/SC29/WG11 and ITU-T SG . 16), ,24 Apr. 1, 2008 (Apr. 24, 2008), XP030007382.

Kikuchi: "Simplification of the Weighted Prediction & Verification Result", ITU SRJDY Group 16—Video Coding Experts Group—ISO/IEC MPEG & ITU-T VCEG(ISO/IEC JTC1/SC29/WG11 and ITU-T SG16 Q6), No. JVT-F077r1, Dec. 13, 2002 (Dec. 13, 2002).

Kikuchi Y., et al., "Multi-Frame Interpolative Prediction with Modified Syntax," 3rd Meeting: Fairfax, Virginia, USA, Mar. 6-10, 2002, JVT-O066, 13 pages.

Popyack J.L., "Rounding Error", Jun. 2000, available at https://www.cs.drexel.edu/~introcs/Fa03/extras/Rounding/index.html.

Qualcomm: "Switched Interpolation Filter with Offset" ITU-T SG16/Q.6 DOC. T05-SG-C 463-E, International Telecommunication Union, Geneva, CH, Apr. 14, 2008, pp. 1-4, XP007908845.

Richardson, Laian, "H.264 and MPEG-4 Video Compression: Video Coding for Next-generation Multimedia", Dec. 2003, pp. 159-223, John Wiley & Sons.

Sullivan et al., "Meeting report of the fifth meeting of the Joint Collaborative Team on Video Coding (JCT-VC), Geneva, CH, Mar. 16-23, 2011," 5th Meeting: Geneva, CH, Mar. 16-23, 2011, JCTVC-E600v3, pp. 1-211.

Sullivan, et al., "Meeting report of the seventh meeting of the Joint Collaborative Team on Video Coding (JCT-VC), Geneva, CH, Nov. 21-30, 2011," Joint Collaborative Team on Video Coding (JCT-VC) of ITU-T SG16 WP3 and ISO/IEC JTC1/SC29/WG11 7th Meeting: Geneva, CH, Nov. 21-30, 2011, Document: JCTVC-G1100, 305 pp.

Sullivan et al., "Meeting report of the sixth meeting of the Joint Collaborative Team on Video Coding (JCT-VC), Torino, IT, Jul. 14-22, 2011," 6th Meeting: Torino, IT, Jul. 14-22, 2011, JCTVC-F800, pp. 1-257.

Sullivan et al., "Overview of the H.265/HEVC Video Coding Standard," IEEE Transactions on Circuits and Systems for Video Technology, vol. 22, No. 12, Dec. 2012, pp. 1649-1668.

Sullivan G J, et al., "Video Compression—From Concepts to the H.264/AVC Standard" Proceedings of the IEEE, IEEE. New York, US LNKD- DOI:10.1109/JPROC.2004.839617, vol. 93, No. 1, Jan. 1, 2005 (Jan. 1, 2005), pp. 18-31, XP011123850 ISSN: 0018-9219 the whole document.

Taiwan Search Report—TW098123535—TIPO—Jan. 28, 2014.

Taiwan Search Report—TW098123558—TIPO—Oct. 26, 2012.

Takamura et al., "Weighted Prediction with Parameter Estimation," 6th Meeting: Torino, IT, Jul. 14-22, 2011, JCTVC-F397, pp. 1-3.

Tanizawa et al., "AHG18: Explicit Weighted Prediction with simple WP parameter estimation," 6th Meeting: Torino, IT, Jul. 14-22, 2011, JCTVC-F326, pp. 1-9.

Tanizawa et al., "Cross-Checking Reports of Improved Weighted Prediction," 7th Meeting: Geneva, CH, Nov. 21-30, 2011, JCTVC-G524, pp. 1-3.

Tourapis et a: "H.264/MPEG-4 AVC Reference Software Enhancements" Internet Citation Jan. 17, 2005 (Jan. 17, 2005), XP002444400 Retrieved from the Internet: URL:ftp3.i tu.ch/av-arch/jvt-s i te/2005_01_H ongKong/JVT-N014.doc> [retrieved on Jul. 26, 2007] p. 6-p. 9.

Wiegand T., et al., "Overview of the H.264/AVC Video Coding Standard", IEEE Transactions on Circuits and Systems for Video Technology, IEEE Service Center, Piscataway, NJ, US, vol. 13, No. 7, Jul. 1, 2003 (Jul. 1, 2003), pp. 560-576, XP011221093, ISSN: 1051-8215, DOI:10.1109/TCSVT.2003.815165.

Ye et al., "Improved Weighted Prediction," 7th Meeting: Geneva, CH, Nov. 21-30, 2011, JCTVC-G065, pp. 1-5.

Ye Y, et al., "High precision interpolation and prediction" 35. VCEG Meeting; 85. MPEG Meeting; Jul. 16, 2008-Jul. 18, 2008; Berlin; (Video Coding Experts Group of ITU-T SG. 16), Jul. 12, 2008 (Jul. 12, 2008), XP030003598.

Yin, P. et al., "Localized Weighted Prediction for Video Coding", IEEE International Symposium on Circuits and Systems (ISCAS), May 23, 2005, pp. 4365-4368, vol. 5, IEEE, XP010816640 ISBN: 978-0-7803-8834-5.

NON-ZERO ROUNDING AND PREDICTION MODE SELECTION TECHNIQUES IN VIDEO ENCODING

This application is a continuation of U.S. application Ser. No. 12/499,990, filed Jul. 9, 2009, which is hereby incorporated by reference in its entirety.

This application is also related to U.S. Pat. No. 8,711,930, which issued on Apr. 29, 2014.

TECHNICAL FIELD

The disclosure relates to video encoding and, more particularly, video encoding techniques that use bi-directional prediction.

BACKGROUND

Digital multimedia capabilities can be incorporated into a wide range of devices, including digital televisions, digital direct broadcast systems, wireless communication devices, wireless broadcast systems, personal digital assistants (PDAs), laptop or desktop computers, digital cameras, digital recording devices, video gaming devices, video game consoles, cellular or satellite radio telephones, digital media players, and the like. Digital multimedia devices may implement video coding techniques, such as MPEG-2, ITU-H.263, MPEG-4, or ITU-H.264/MPEG-4 Part 10, Advanced Video Coding (AVC), to transmit and receive or store and retrieve digital video data more efficiently. Video encoding techniques may perform video compression via spatial and temporal prediction to reduce or remove redundancy inherent in video sequences.

In video encoding, the compression often includes spatial prediction, motion estimation and motion compensation. Intra-coding relies on spatial prediction and transform coding, such as discrete cosine transform (DCT), to reduce or remove spatial redundancy between video blocks within a given video frame. Inter-coding relies on temporal prediction and transform coding to reduce or remove temporal redundancy between video blocks of successive video frames of a video sequence. Intra-coded frames ("I-frames") are often used as random access points as well as references for the inter-coding of other frames. I-frames, however, typically exhibit less compression than other frames. The term I-units may refer to I-frames, I-slices or other independently decodable portions of an I-frame.

For inter-coding, a video encoder performs motion estimation to track the movement of matching video blocks between two or more adjacent frames or other coded units, such as slices of frames. Inter-coded frames may include predictive frames ("P-frames"), which may include blocks predicted from a previous frame, and bidirectional predictive frames ("B-frames"), which may include blocks predicted from a previous frame and a subsequent frame of a video sequence. The terms P-frames and B-frames are somewhat historic in the sense that early coding techniques limited prediction in specific directions. Newer coding formats and standards may not limit the prediction direction of P-frames or B-frames. Thus, the term "bi-directional" now refers to prediction based on two or more lists of reference data regardless of the temporal relationship of such reference data relative to the data being coded.

Consistent with newer video standards such as ITU H.264, for example, bi-directional prediction may be based on two different lists which do not necessarily need to have data that resides temporally before and after the current video block. In other words, B-video blocks may be predicted from two lists of data, which may correspond to data from two previous frames, two subsequent frames, or one previous frame and one subsequent frame. In contrast, P-video blocks are predicted based on one list, i.e., one data structure, which may correspond to one predictive frame, e.g., one previous frame or one subsequent frame. B-frames and P-frames may be more generally referred to as P-units and B-units. P-units and B-units may also be realized in smaller coded units, such as slices of frames or portions of frames. B-units may include B-video blocks, P-video blocks or I-video blocks. P-units may include P-video blocks or I-video blocks. I-units may include only I-video blocks.

For P- and B-video blocks, motion estimation generates motion vectors, which indicate the displacement of the video blocks relative to corresponding prediction video blocks in predictive reference frame(s) or other coded units. Motion compensation uses the motion vectors to generate prediction video blocks from the predictive reference frame(s) or other coded units. After motion compensation, a residual video block is formed by subtracting the prediction video block from the original video block to be coded. The video encoder usually applies transform, quantization and entropy coding processes to further reduce the bit rate associated with communication of the residual block. I- and P-units are commonly used to define reference blocks for the inter-coding of P- and B-units.

SUMMARY

This disclosure describes video encoding and decoding techniques applicable to bi-directional prediction. In bi-directional prediction, a video block may be predictively encoded and decoded based on two different lists of predictive reference data. In one aspect of this disclosure, weighted prediction may be performed to reduce the rounding error can accumulate.

One embodiment include method of encoding video data. The method includes receiving a current video block, determining a first prediction block from a reference frame in a first list, determining a second prediction block from a reference frame in a second list, and generating a weighted prediction data that depends on at least the two prediction blocks from the reference frames in the two or more lists of data and includes at least two offsets and a rounding adjustment. Generating the weighted prediction data includes left-shifting a sum of the at least two offsets by a rounding adjustment to generate a first intermediate value, summing the product of the first prediction block by a first weighting factor, the product of the second prediction block by a second weighting factor, and two raised to the rounding adjustment to generate a second intermediate, and right-shifting the sum of the first intermediate value and the second intermediate value by the rounding adjustment plus one to generate the weighted prediction data. The method further includes determining a residual block as a difference between the current video block and the weighted prediction data, transforming the residual block to generate a residual transform coefficient block, quantizing the residual transform coefficient block to generate quantized residual coefficients, and entropy coding the quantized residual coefficients to produce an encoded video bitstream.

One embodiment includes a method of decoding video data. The method includes receiving an encoded video bitstream, entropy decoding the encoded video bitstream to generate quantized residual coefficients, inverse transforming the quantized residual coefficients to generate a residual block, determining a first prediction block form a reference frame in a first list, determining a second prediction block from a reference frame in a second list, and generating a weighted prediction data that depends on at least the two prediction blocks from the reference frames in the two or more lists of data and includes at least two offsets and a rounding adjustment. Generating the weighted prediction data includes left-shifting a sum of the at least two offsets by a rounding adjustment to generate a first intermediate value, summing the product of the first prediction block by a first weighting factor, the product of the second prediction block by a second weighting factor, and two raised to the rounding adjustment to generate a second intermediate, and right-shifting the sum of the first intermediate value and the second intermediate value by the rounding adjustment plus one to generate the weighted prediction data. The method further includes adding the residual block and the weighted prediction data to obtain a reconstructed block and outputting the reconstructed block as decoded video data.

Other embodiments include apparatuses for encoding video data and apparatuses for decoding video data.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
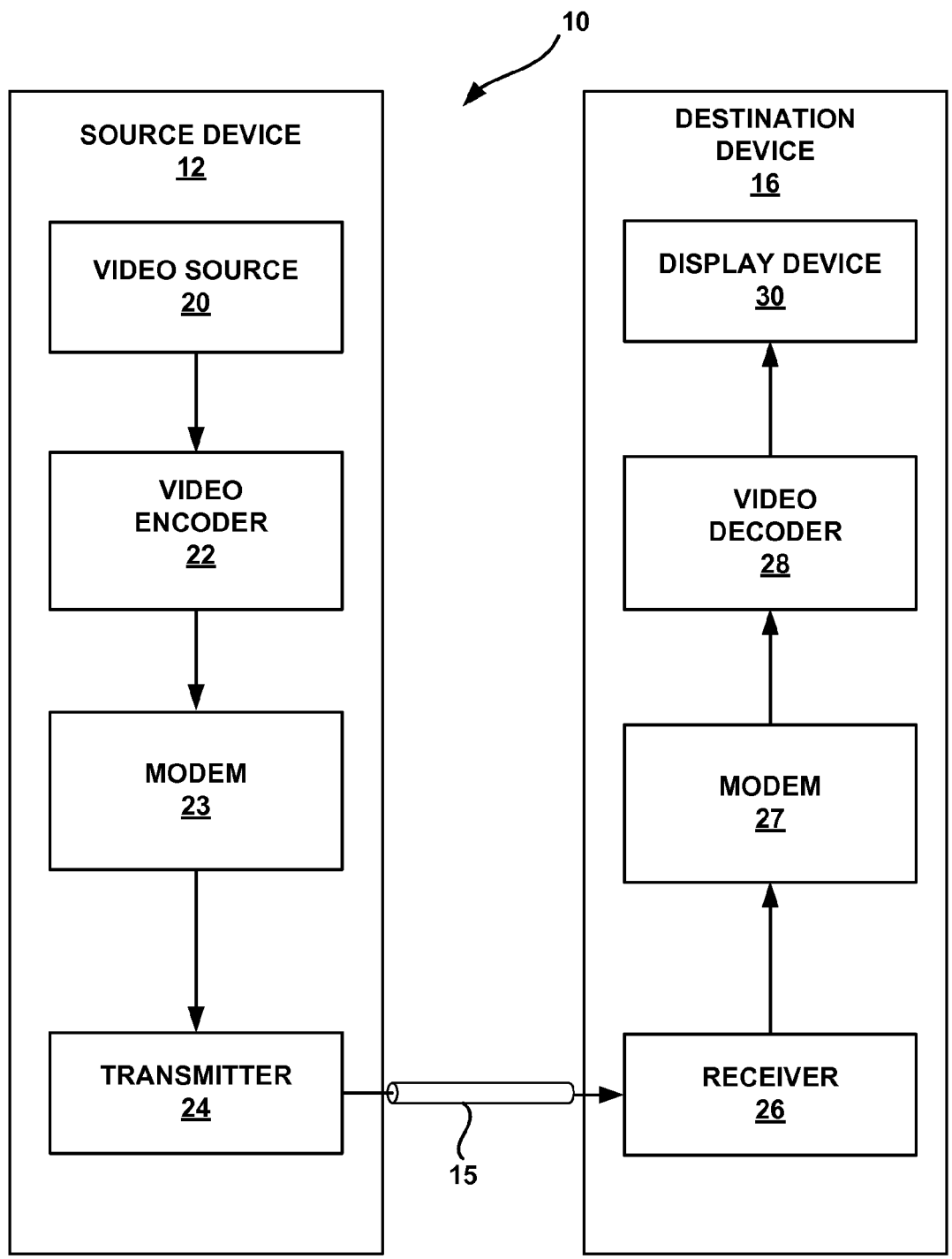
FIG. 1 is a block diagram illustrating one exemplary video encoding and decoding system that may implement techniques of this disclosure.

This disclosure describes video encoding and decoding techniques applicable to bi-directional prediction. In bi-directional prediction, a video block is predictively encoded and decoded based on two different lists of predictive reference data. In one aspect of this disclosure, rounding adjustments to bi-directional predictive data may be purposely eliminated to provide predictive data that lacks any rounding bias. In this case, rounded and unrounded predictive data may both be considered in a rate-distortion analysis to identify the best data for prediction of a given video block. One or more syntax elements may be encoded to indicate the selection, and a decoder may interpret the one or more syntax elements in order to determine whether rounding should be used in the decoding process.

In another aspect of this disclosure, encoding techniques are described for selecting among default weighted prediction, implicit weighted prediction, and explicit weighted prediction. In this context, techniques are also described for adding offset to prediction data, e.g., using the format of explicit weighted prediction to allow for offsets to predictive data that is otherwise determined by implicit or default weighted prediction.

Weighted prediction refers to bi-directional prediction in which weights can be assigned to two or more different sets of predictive data. Default weighted prediction refers to weighted prediction in which the weight factors associated with two or more different lists are pre-defined by some default setting. Default weighted prediction, in some cases, may assign equal weightings to each of the lists. Implicit weighted prediction refers to weighted prediction in which the weight factors associated with two or more different lists are defined based on some implicit factors associated with the data. For example, implicit weight factors may be defined by the temporal positions of the data in the two different lists relative to the data being predictively coded. If data in list 0 is temporally closer to the data being predictively coded than data in list 1, then the data is list 0 may be assigned a greater implicit weigh factor in implicit weighted prediction.

Explicit weighted prediction refers to weighted prediction in which the weight factors are dynamically defined as part of the coding process, and encoded into the bitstream. Explicit weighted prediction is different than default weighted prediction and implicit weighted prediction in this respect, e.g., explicit weighted prediction results in weight factors that are encoded as part of the bitstream whereas default and implicit weighted prediction define weight factors that are either pre-defined or determined by the decoder without the weight factors being in the bitstream.

In accordance with one aspect of this disclosure, weighted prediction may be modified relative to conventional weighted prediction by eliminating rounding adjustments to the weighted prediction data. In this case, the encoder may analyze and consider weighted prediction data that is both rounded and unrounded, and may use either the rounded or unrounded weighted prediction data based on a rate-distortion analysis. One or more syntax elements may be defined and encoded into the bitstream in order to identify whether the rounded or unrounded weighted prediction data was used. The decoder may interpret the one or more syntax elements in order to determine whether rounded or unrounded weighted prediction data should be used in the decoding.

In accordance with another aspect of this disclosure, encoding techniques are described for selecting among default weighted prediction, implicit weighted prediction, and explicit weighted prediction. Rather than consider each of these possibilities relative to one another, an encoder may be programmed to select between default weighted prediction and implicit weighted prediction. The selection, then, may be compared to explicit weighted prediction. Explicit weighted prediction may be performed to calculate explicit weight factors, but the computed explicit weighted prediction may also be compared to explicit weighted prediction having weight factors that correspond to those defined by either default weighted prediction or implicit weighted prediction.

Explicit weighted prediction may have an advantage relative to default weighted prediction and implicit weighted prediction in that explicit weighted prediction allows for an offset to be added to the predictive data. The offset may bias or adjust the predictive data and may be very useful in accounting for flashes, a darkening sky, scene changes, or other types of illumination changes between video frames. The offset, for example, may provide a common adjustment for all values of a video block, e.g., to bias the values upward or downward. In accordance with this disclosure, the weight factors defined by either default weighted prediction or implicit weighted prediction may be considered in the context of explicit weighted prediction, thereby facilitating the addition of offset while maintaining weight factors associated with default or implicit weighted prediction. In this manner, predictive data may be improved, which may help to improve data compression in some cases.

FIG. 1 is a block diagram illustrating one exemplary video encoding and decoding system 10 that may implement techniques of this disclosure. As shown in FIG. 1, system 10 includes a source device 12 that transmits encoded video to a destination device 16 via a communication channel 15. Source device 12 and destination device 16 may comprise any of a wide range of devices. In some cases, source device 12 and destination device 16 comprise wireless communication devices, such as wireless handsets, so-called cellular or satellite radiotelephones, or any devices that can communicate video information over a communication channel 15, which may or may not be wireless. The techniques of this disclosure, however, which concern non-zero rounding and prediction mode selection techniques, are not necessarily limited to wireless applications or settings.

In the example of FIG. 1, source device 12 may include a video source 20, video encoder 22, a modulator/demodulator (modem) 23 and a transmitter 24. Destination device 16 may include a receiver 26, a modem 27, a video decoder 28, and a display device 30. In accordance with this disclosure, video encoder 22 of source device 12 may be configured to apply non-zero rounding and prediction mode selection techniques as part of a video encoding process. Video decoder 28 may receive one or more syntax elements indicating the selection and indicating whether non-zero rounding was used. Accordingly, video decoder 28 may perform the proper weighted prediction signaled in the received bistream.

The illustrated system 10 of FIG. 1 is merely exemplary. The non-zero rounding and prediction mode selection techniques of this disclosure may be performed by any coding device that supports bi-directional motion compensated prediction. Source device 12 and destination device 16 are merely examples of such coding devices in which source device 12 generates coded video data for transmission to destination device 16. In some cases, devices 12, 16 may operate in a substantially symmetrical manner such that, each of devices 12, 16 includes video encoding and decoding components. Hence, system 10 may support one-way or two-way video transmission between video devices 12, 16, e.g., for video streaming, video playback, video broadcasting, or video telephony.

Video source 20 of source device 12 may include a video capture device, such as a video camera, a video archive containing previously captured video, or a video feed from a video content provider. As a further alternative, video source 20 may generate computer graphics-based data as the source video, or a combination of live video, archived video, and computer-generated video. In some cases, if video source 20 is a video camera, source device 12 and destination device 16 may form so-called camera phones or video phones. In each case, the captured, pre-captured or computer-generated video may be encoded by video encoder 22. The encoded video information may then be modulated by modem 23 according to a communication standard, e.g., such as code division multiple access (CDMA) or another communication standard, and transmitted to destination device 16 via transmitter 24. Modem 23 may include various mixers, filters, amplifiers or other components designed for signal modulation. Transmitter 24 may include circuits designed for transmitting data, including amplifiers, filters, and one or more antennas.

Receiver 26 of destination device 16 receives information over channel 15, and modem 27 demodulates the information. Again, the video encoding process may implement one or more of the techniques described herein to provide non-zero rounding and prediction mode selection consistent with this disclosure. The information communicated over channel 15 may include information defined by video encoder 22, which may be used by video decoder 28 consistent with this disclosure. Display device 30 displays the decoded video data to a user, and may comprise any of a variety of display devices such as a cathode ray tube, a liquid crystal display (LCD), a plasma display, an organic light emitting diode (OLED) display, or another type of display device.

In the example of FIG. 1, communication channel 15 may comprise any wireless or wired communication medium, such as a radio frequency (RF) spectrum or one or more physical transmission lines, or any combination of wireless and wired media. Accordingly, modem 23 and transmitter 24 may support many possible wireless protocols, wired protocols or wired and wireless protocols. Communication channel 15 may form part of a packet-based network, such as a local area network (LAN), a wide-area network (WAN), or a global network, such as the Internet, comprising an interconnection of one or more networks. Communication channel 15 generally represents any suitable communication medium, or collection of different communication media, for transmitting video data from source device 12 to destination device 16. Communication channel 15 may include routers, switches, base stations, or any other equipment that may be useful to facilitate communication from source device 12 to destination device 16.

Video encoder 22 and video decoder 28 may operate according to a video compression standard, such as the ITU-T H.264 standard, alternatively described as MPEG-4, Part 10, Advanced Video Coding (AVC). The techniques of this disclosure, however, are not limited to any particular coding standard. Although not shown in FIG. 1, in some aspects, video encoder 22 and video decoder 28 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

Work to advance the H.264/MPEG-4 AVC standard takes place in various forums of the ITU-T, such as the Key Technologies Area (KTA) forum. The KTA forum seeks, in part, coding technologies that exhibit higher coding efficiency than that exhibited by the H.264/AVC standard. The techniques described in this disclosure may provide for coding improvements relative to the H.264/AVC standard. Recently, the KTA forum received a document detailing techniques that may be considered relevant or related to the techniques described herein, as a submission numbered VCEG-AI33, titled "High Precision Interpolation and Prediction," by Yan Ye, Peisong Chen, and Marta Karczewicz and presented at the 35$^{th}$ Meeting in Berlin, Germany, occurring on Jul. 16-18, 2008, which is hereby incorporated by reference in its entirety.

Video encoder 22 and video decoder 28 each may be implemented as one or more microprocessors, digital signal processors (DSPs), application specific integrated circuits (ASICs), field programmable gate arrays (FPGAs), discrete logic, software, hardware, firmware or any combinations thereof. Each of video encoder 22 and video decoder 28 may be included in one or more encoders or decoders, either of which may be integrated as part of a combined encoder/decoder (CODEC) in a respective mobile device, subscriber device, broadcast device, server, or the like.

A video sequence typically includes a series of video frames. Video encoder 22 and video decoder 28 may operate on video blocks within individual video frames in order to encode and decode the video data. The video blocks may have fixed or varying sizes, and may differ in size according to a specified coding standard. Each video frame may include a series of slices or other independently decodable units. Each slice may include a series of macroblocks, which may be arranged into sub-blocks. As an example, the ITU-T H.264 standard supports intra prediction in various block sizes, such as 16 by 16, 8 by 8, or 4 by 4 for luma components, and 8×8 for chroma components, as well as inter prediction in various block sizes, such as 16 by 16, 16 by 8, 8 by 16, 8 by 8, 8 by 4, 4 by 8 and 4 by 4 for luma components and corresponding scaled sizes for chroma components. Video blocks may comprise blocks of pixel data, or blocks of transformation coefficients, e.g., following a transformation process such as discrete cosine transform or a conceptually similar transformation process.

Smaller video blocks can provide better resolution, and may be used for locations of a video frame that include high levels of detail. In general, macroblocks and the various sub-blocks may be considered to be video blocks. In addition, a slice may be considered to be a series of video blocks, such as macroblocks and/or sub-blocks. Each slice may be an independently decodable unit of a video frame. Alternatively, frames themselves may be decodable units, or other portions of a frame may be defined as decodable units. The term "coded unit" refers to any independently decodable unit of a video frame such as an entire frame, a slice of a frame, a group of pictures (GOPs), or another independently decodable unit defined according to the coding techniques used.

Following inter-based predictive encoding (which includes interpolation and the techniques of this disclosure to efficiently select a prediction algorithm or mode by which to predict a coded unit), and following any transforms (such as the 4×4 or 8×8 integer transform used in H.264/AVC or a discrete cosine transform or DCT), quantization may be performed. Quantization generally refers to a process in which coefficients are quantized to possibly reduce the amount of data used to represent the coefficients. The quantization process may reduce the bit depth associated with some or all of the coefficients. For example, a 16-bit value may be rounded down to a 15-bit value during quantization. Following quantization, entropy coding may be performed, e.g., according to content adaptive variable length coding (CAVLC), context adaptive binary arithmetic coding (CABAC), or another entropy coding methodology.

The techniques of this disclosure are specifically applicable to weighted bi-directional prediction. As mentioned above, bi-directional prediction is prediction of so-called "B-video blocks" based on two different lists of data. B-video blocks may be predicted from two lists of data from two previous frames, two lists of data from subsequent frames, or one list of data from a previous frame and one from a subsequent frame. In contrast, P-video blocks are predicted based on one list, which may correspond to one predictive frame, e.g., one previous frame or one subsequent frame. B-frames and P-frames may be more generally referred to as P-units and B-units. P-units and B-units may also be realized in smaller coded units, such as slices of frames or portions of frames. B-units may include B-video blocks, P-video blocks or I-video blocks. P-units may include P-video blocks or I-video blocks. I-units may include only I-video blocks.

Weighted bi-directional prediction refers to bi-directional prediction that allows for weight factors to be assigned to the two different lists. Each list may comprise a set of data associated with a predictive frame or other coded unit. In weighted bi-directional prediction one list may be weighted more heavily in generating predictive data. If one of the lists has data that is more similar to the video block being coded, for example, then that list may be weighted more heavily than the other list.

For different types of weighted bi-directional prediction in accordance with ITU-T H.264, video encoder 22 and video decoder 28 may generally support three different types of prediction modes. A first prediction mode, referred to as "default weighted prediction," refers to weighted prediction in which the weight factors associated with two or more different lists are pre-defined by some default setting. Default weighted prediction, in some cases, may assign equal weightings to each of the lists.

A second prediction mode, referred to as "implicit weighted prediction," refers to weighted prediction in which the weight factors associated with two or more different lists are defined based on some implicit factors associated with the data. For example, implicit weight factors may be defined by the relative temporal positions of the data in the two different lists relative to the data being predictively coded. In both default weighted prediction and implicit weighted prediction, the weight factors are not included in the bitstream. Instead, video decoder 28 may be programmed to know the weight factors (for default) or may be programmed to know how to derive the weight factors (for implicit).

A third prediction mode, referred to as "explicit weighted prediction," refers to weighted prediction in which the weight factors are dynamically defined as part of the coding process, and encoded into the bitstream. Explicit weighted prediction is different than default weighted prediction and implicit weighted prediction in this respect, e.g., explicit weighted prediction results in weight factors that are encoded as part of the bitstream.

In accordance with one aspect of this disclosure, weighted prediction may be modified relative to conventional weighted prediction by eliminating rounding adjustments to the weighted prediction data. In this case, encoder 22 may analyze and consider weighted prediction data that is both rounded and unrounded, and may use either the rounded or unrounded weighted prediction data based on a rate-distortion analysis. One or more syntax elements may be defined and encoded into the bitstream in order to identify whether the rounded or unrounded weighted prediction data was used. Decoder 28 may decode and interpret the syntax element(s), and based on the syntax element(s), decoder 28 may use either the rounded or unrounded weighted prediction data in the decoding process. The removal of rounding adjustments is applicable to default weighted prediction, implicit weighted prediction and explicit weighted prediction.

In accordance with another aspect of this disclosure, video encoder 22 may select among default weighted prediction, implicit weighted prediction, and explicit weighted prediction. In this aspect, rather than consider each of these possibilities relative to one another, encoder 22 may be programmed to select between default weighted prediction and implicit weighted prediction. The selection, then, may be compared to explicit weighted prediction. Specifically, encoder 22 may perform explicit weighted prediction to calculate explicit weight factors, but encoder 22 may also compare the computed explicit weighted prediction to explicit weighted prediction having weight factors that correspond to those defined by either default weighted prediction or implicit weighted prediction.

Explicit weighted prediction may have an advantage relative to default weighted prediction and implicit weighted prediction in that explicit weighted prediction allows for an offset to be encoded. The offset may adjust the predictive data and may be very useful in accounting for flashes, a darkening sky, scene changes, or other types of illumination changes between video frames. In accordance with this disclosure, the weight factors defined by either default weighted prediction or implicit weighted prediction may be considered by video encoder 22 in the context of explicit weighted prediction, thereby facilitating the addition of offset while maintaining weight factors associated with default or implicit weighted prediction. In this manner, predictive data may be improved in some cases, which may help to improve data compression.

In the context of video encoding, video encoder 22 can calculate a DC offset by first averaging luma pixel values for a luma video block being encoded. Video encoder 22 may next average luma pixel values for the predictive video block used to encode the video block. Each of these calculated values may comprise a DC value. Video encoder 22 may compute the DC offset by subtracting the DC values from one another, e.g., by subtracting the average luma value of the current block being coded from the average luma value of the predictive block used to encode the current block. DC offsets might also be defined for chroma components, if desired. DC offsets may also be accumulated over a given coded unit (e.g., a frame or a slice) and defined for a coded unit as the average of offsets for all of the blocks of a given coded unit.

Figure 2:
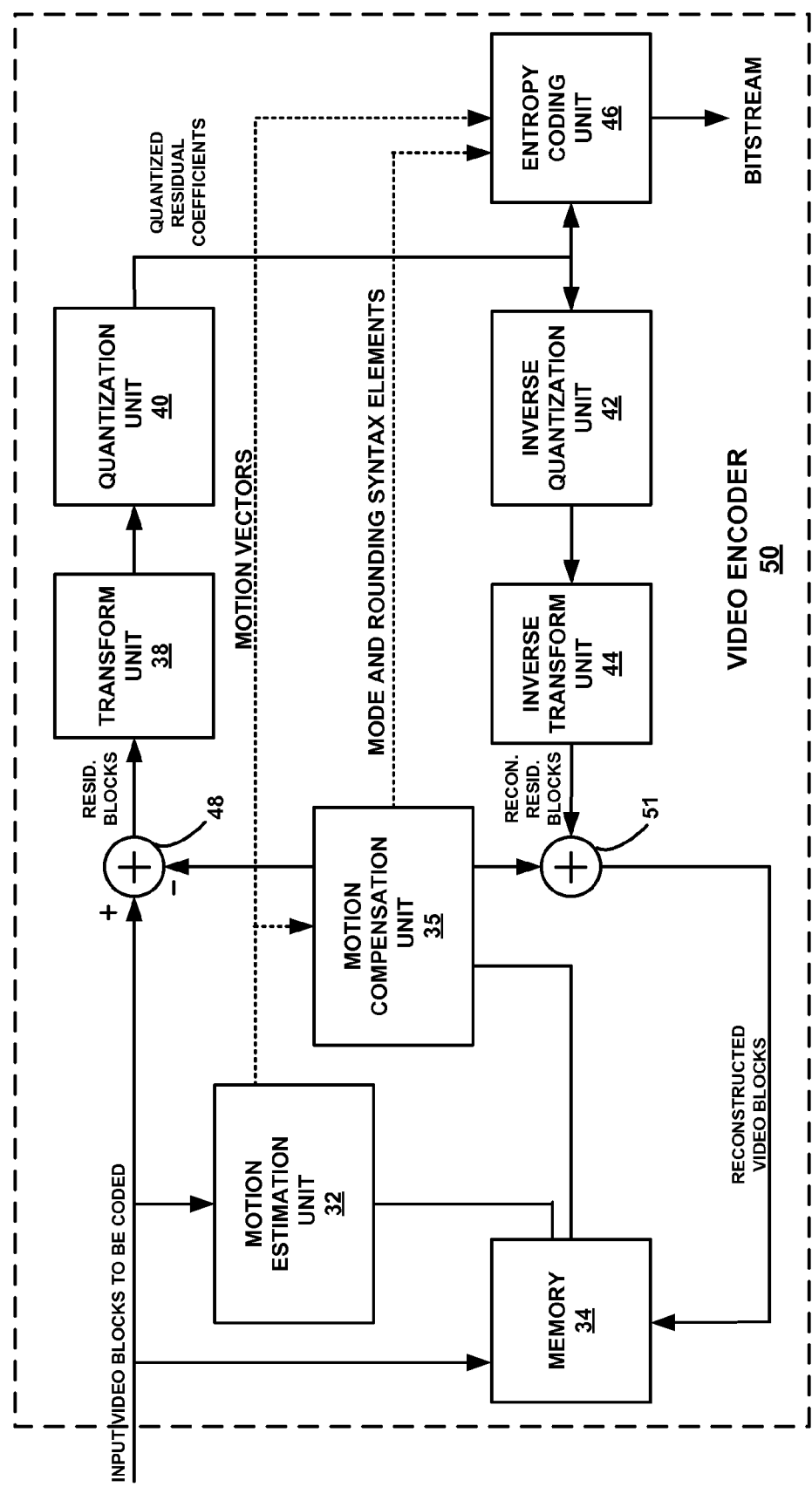
FIG. 2 is a block diagram illustrating an example of a video encoder that may perform offset techniques consistent with this disclosure.

FIG. 2 is a block diagram illustrating an example of a video encoder 50 that may perform techniques consistent with this disclosure. Video encoder 50 may correspond to video encoder 22 of source device 12, or a video encoder of a different device. Video encoder 50 may perform intra- and inter-coding of blocks within video frames, although intra-coding components are not shown in FIG. 2 for ease of illustration. Intra-coding relies on spatial prediction to reduce or remove spatial redundancy in video within a given video frame. Inter-coding relies on temporal prediction to reduce or remove temporal redundancy in video within adjacent frames of a video sequence. Intra-mode (I-mode) may refer to the spatial based compression mode and Inter-modes such as prediction (P-mode) or bi-directional (B-mode) may refer to the temporal based compression modes.

As shown in FIG. 2, video encoder 50 receives a current video block within a video frame or slice to be encoded. In the example of FIG. 2, video encoder 50 includes motion estimation unit 32, a motion compensation unit 35, a memory 34, an adder 48, a transform unit 38, a quantization unit 40, and an entropy coding unit 46. For video block reconstruction, video encoder 50 also includes an inverse quantization unit 42, an inverse transform unit 44, and an adder 51. Video encoder 50 may also include a deblocking filter (not shown) to filter block boundaries to remove blockiness artifacts from reconstructed video. If desired, the deblocking filter would typically filter the output of adder 51.

During the encoding process, video encoder 50 receives a video block to be coded, and motion estimation unit 32 and motion compensation unit 35 perform inter-predictive coding. Motion estimation unit 32 and motion compensation unit 35 may be highly integrated, but are illustrated separately for conceptual purposes. Motion estimation is typically considered the process of generating motion vectors, which estimate motion for video blocks. A motion vector, for example, may indicate the displacement of a predictive block within a predictive frame (or other coded unit) relative to the current block being coded within the current frame (or other coded unit). Motion compensation is typically considered the process of fetching or generating the predictive block based on the motion vector determined by motion estimation. Again, motion estimation unit 32 and motion compensation unit 35 may be functionally integrated. For demonstrative purposes, the techniques described in this disclosure are described as being performed by motion compensation unit 35.

Motion estimation unit 32 selects the appropriate motion vector for the video block to be coded by comparing the video block to video blocks of one or more predictive coded units (e.g., a previous and/or future frame in terms of time or temporally). Motion estimation unit 32 may, as an example, select a motion vector for a B-frame in a number of ways. In one way, motion estimation unit 32 may select a previous or future frame from a first set of frames (referred to as list 0) and determine a motion vector using only this previous or future frame from list 0. Alternatively, motion estimation unit 32 may select a previous or future frame from a second set of frames (referred to as list 1) and determine a motion vector using only this previous or future frame from list 1. In yet another way, motion estimation unit 32 may select a first frame from list 0 and a second frame from list 1 and select one or more motion vectors from the first frame of list 0 and the second frame of list 1. This third form of prediction may be referred to as bi-predictive motion estimation. Techniques of this disclosure may be implemented so as to efficiently select a motion-compensated bi-prediction mode. The selected motion vector for any given list may point to a predictive video block that is most similar to the video block being coded, e.g., as defined by a metric such as sum of absolute difference (SAD) or sum of squared difference (SSD) of pixel values of the predictive block relative to pixel values of the block being coded.

According to the ITU-T H.264/AVC standard, three motion-compensated bi-predictive algorithms or modes may be used to predict a B-frame or portions thereof, such as video blocks, macroblocks or any other discreet and/or contiguous portion of a B-frame. A first motion-compensated bi-predictive algorithm or mode, which is commonly referred to as default weighted prediction, may involve applying default weights to each identified video block of the first frame of list 0 and the second frame of list 1. The default weights may be programmed according to the standard, and are often selected to be equal for default weighted prediction. The weighted blocks of the first and second frames are then added together and divided by the total number of frames used to predict the B-frame, e.g., two in this instance. Often, this division is accomplished by adding 1 to the addition of the weighted blocks of the first and second frames and then shifting the result to the right by one bit. The addition of 1 is a rounding adjustment.

In accordance with one aspect of this disclosure, the addition of 1 (the rounding adjustment) prior to the right shift by one may be avoided, thus eliminating upward biased rounding. Motion compensation unit 35 may generate both a weighted block with rounding and a weighted block without rounding, and may select the block that achieves the best coding efficiency.

More generally, weighted prediction may be given by:

$$\text{pred}(i,j)=(\text{pred0}(i,j)*w0+\text{pred1}(i,j)*w1+2^r)>>(r+1)$$

where pred(i,j) is data associated with the weighed prediction block, pred0($i,j$) is data from list 0, pred1($i,j$) is data from list 1, w0 and w1 are the weight factors, $2^r$ is the rounding term, and >> is a right shift operation by (r+1) bits. Consistent with this disclosure, two different version of pred(i,j) may be generated and considered by motion compensation unit 35. The first is consistent with the equation above, and the second is consistent with the equation above without rounding, i.e., with the term "$2^r$" removed from the equation Eliminating this rounding may achieve better weighted predictive data in some cases, which can improve coding efficiency. Motion compensation unit 35 may generate one or more syntax elements to define whether or not rounding was used for a given video block or set of video blocks. Both the bi-directional prediction mode and the one or more syntax elements indicating whether rounding was used may be output form motion compensation unit 35 to entropy coding unit 46 for inclusion in the encoded bitstream.

B pictures use two lists of previously-coded reference pictures, list 0 and list 1. These two lists can each contain past and/or future coded pictures in temporal order. Blocks in a B picture may be predicted in one of several ways: motion-compensated prediction from a list 0 reference picture, motion-compensated prediction from a list 1 reference picture, or motion-compensated prediction from the combination of both list 0 and list 1 reference pictures. To get the combination of both list 0 and list 1 reference pictures, two motion compensated reference areas are obtained from list 0 and list 1 reference picture respectively. Their combination will be used to predict the current block.

In this disclosure, the term "B pictures" will be used to refer generally to any types of B units, which may be B frames, B slices, or possibly other video units that include at least some B video blocks. As mentioned, B pictures may allow 3 types of weighted prediction. For simplicity, only forward prediction in unidirectional prediction is shown below, although backwards prediction could also be used.

Default weighted prediction may be defined by the following equations for unidirectional prediction and bidirectional prediction, respectively.

Unidirectional prediction: pred($i,j$)=pred0($i,j$)

Bidirectional prediction: pred($i,j$)=(pred0($i,j$)+pred1($i,j$)+1)>>1 where pred0($i,j$) and pred1($i,j$) are prediction data from list 0 and list 1.

Implicit weighted prediction may be defined by the following equations for unidirectional prediction and bidirectional prediction, respectively.

Unidirectional prediction: pred($i,j$)=pred0($i,j$)

Bidirectional prediction: pred($i,j$)=(pred0($i,j$)*w0+pred1($i,j$)*w1+32)>>6

In this case, each prediction is scaled by a weighting factor w0 or w1, where w0 and w1 are calculated based on the relative temporal position of the list 0 and list 1 reference pictures.

Explicit weighted prediction may be defined by the following equations for unidirectional prediction and bidirectional prediction, respectively.

Unidirectional prediction: pred($i,j$)=(pred0($i,j$)*w0+$2^{r\times1}$)>>r+o1

Bidirectional prediction: pred($i,j$)=(pred0($i,j$)*w0+pred1($i,j$)*w1+$2^r$)>>(r+1)+((o1+o2+1)>>1)

In this case, the weighting factors are determined by the encoder and transmitted in the slice header, and o1 and o2 are picture offsets for list 0 and list 1 reference pictures respectively.

Conventionally, rounding adjustments are always used in bidirectional prediction. According to the equations above, a rounding adjustment of 1 is used in the default weighted prediction prior to a right shift by one, and a rounding adjustment of 32 is used in the implicit weighted prediction prior to a right shift by six. Generally, a rounding adjustment of $2^{r-1}$ is commonly used prior to a right shift by r, where r represents a positive integer.

Such frequent and biased rounding operations can reduce precision of prediction. Furthermore, in the bidirectional prediction of the explicit weighted prediction, there are actually 2 roundings, one for the reference pictures and the other for the offsets. Therefore, in this case, the rounding error can accumulate. In accordance with one aspect of this disclosure, instead of doing 2 separate roundings, the video encoder can add the offsets to the weighted prediction before right shift as the following:

$$\text{pred}(i,j)=(\text{pred0}(i,j)*w0+\text{pred1}(i,j)*w1+((o1+o2)<<r)+2^r)>>(r+1),$$

where pred(i,j) is the weighted prediction data associated with rounding, pred0($i,j$) is data from list 0, pred1($i,j$) is data from list 1, w0 and w1 are weight factors, o1 and o2 are offsets, and r and $2^r$ are rounding terms that provide the rounding in conjunction with a right shift operation ">>" by (r+1) bits. This may provide better prediction accuracy. In this case, a new syntax element may also be defined to allow for combination of two different offsets (o1 and o2) into one offset. Furthermore, in this case, a rounding value may comprise the rounding adjustment described above (e.g., $2^r$ prior to a right shift operation by (r+1) bits) as well as another a rounding value ("r") associated with the offset. The equation above may also be modified slightly to provide higher precision for the offsets. If higher precision for the offsets are desired, the offsets may be multiplied by factors (such as by 2) and then rounded to an integer numbers. The left shift may also be changed to account for this added precision to the offset.

Another problem in explicit weighted prediction is that unidirectional prediction and bidirectional prediction may share the same weights and offsets. In order to have more flexibility for better prediction, unidirectional prediction and bidirectional prediction may be decoupled in accordance with this disclosure. In this case, unidirectional prediction and bidirectional prediction may define different weights and offsets for a given type of prediction (default, implicit or explicit). New syntax elements may be defined for explicit prediction to allow for better prediction. An encoder can include the syntax elements in a coded bitstream to signal different rounding modes used by the encoder, so that the same rounding modes can be used by the decoder.

It is beneficial to adaptively select rounding adjustments. One way of doing this is to generate two or more different sets of predictive data (and possibly encode a video block several times) based on the two or more different sets of predictive data. One set of the predictive data may have nonzero rounding and the other may eliminate the rounding. In still other examples, upward rounding, downward rounding, and no rounding may be considered. Motion compensation unit 35 may generate these different types of predictive data, and may conduct a rate-distortion (RD) analysis to select the best predictive data for a given video block.

Rate-distortion (RD) analysis is fairly common in video coding, and generally involves the calculation of a cost metric indicative of the coding cost. The cost metric may balance the number of bits required for the coding (the rate) and the level of quality associated with the coding (the distortion). A typical rate-distortion cost calculation may generally correspond to the format of:

$$J(\lambda)=\lambda R+D,$$

where $J(\lambda)$ is the cost, R is the bit rate, D is the distortion, and $\lambda$ is the Lagrange multiplier.

One way for video encoder 50 to identify the most desired prediction data is to use motion estimation unit 32 to first find motion vectors, and then implement motion compensation unit 35 and adder 48 to calculate prediction errors with and without rounding adjustments. Motion compensation unit 35 may then select the prediction data that yields the least prediction error. The prediction error can be calculated by using the sum of absolute difference between the prediction data and the current data being encoded.

In explicit weighted prediction, motion compensation unit 35 of video encoder 50 may implement three different modes. In all three explicit weighted prediction modes, each reference picture may have one offset used for unidirectional prediction and each pair of reference pictures has one offset for bidirectional prediction such as:

$$pred(i,j)=(pred0(i,j)*w0+pred1(i,j)*w1+(o<<r)+2^r)>>(r+1),$$

where pred(i,j) is the first weighted prediction data, pred0 (i,j) is data from list 0, pred1(i,j) is data from list 1, w0 and w1 are weight factors, o is a common offset applicable the pred0(i,j) from list 0 and the pred1(i,j) from list 1, and r and $2^r$ are rounding terms that provide the rounding in conjunction with a right shift operation ">>" by (r+1) bits. The first mode may use the weights defined by default weighted prediction. The second may use weights defined by implicit weighted prediction. The third mode allows each reference picture to have one weight for unidirectional prediction and each pair of reference pictures involved in bidirectional prediction to have a pair of weights for both reference pictures. The weights defined for the third mode may be determined adaptively, and in some cases, the explicit weighted prediction framework may be used with weights defined by default or implicit weighted prediction in order to allow for offset in these contexts. Furthermore, the weights and offsets defined in this third mode may be different for unidirectional and bidirectional prediction. The equation above may also be modified slightly to provide higher precision for the offset. If higher precision for the offset is desired, the offset may be multiplied by a factor (such as by 2) and then rounded to an integer number. The left shift may also be changed to account for this added precision to the offset, e.g., in this case, the left shift may changed to r−1.

In order for video encoder 50 to signal to a decoder the particular mode that was used for a given video block or set of video blocks, video encoder 50 may implement 2 single-bit syntax elements: derived_weight_flag and poc_weight_flag. In this case, the derived_weight_flag may be used to select between the first two explicit weighted prediction modes mentioned above, and the third mode and poc_weight_flag may be used to select between the first and the second explicit weighted prediction modes.

In order to find the best weighted prediction, video encoder 50 may perform multi-pass encoding and select the best mode based on rate-distortion cost. One way to do this is an exhaustive search where motion compensation unit 35 generates every possible weighted prediction data and selects the best one. To reduce the complexity, however, motion compensation unit 35 may implement additional techniques of this disclosure, e.g., to first select between default weighted prediction and implicit weighted prediction, and then to compare the selection to explicit weighted prediction. Motion compensation unit 35 may calculate weights and offsets associated with explicit weighted prediction, and may also use the explicit weighted prediction framework to add offsets to data otherwise associated with default weighted prediction or implicit weighted prediction, whichever was selected. Thus, there may be two sets of offsets calculated by motion compensation unit 35. The first set of offsets may be calculated by using known weights used in the default weighted prediction or the implicit weighted prediction, and the second set of offsets may be calculated jointly with weights as part of a normal calculation of explicit weighted prediction, e.g., by minimizing the motion compensated prediction error.

To further reduce the complexity, during explicit weighted prediction, if the offsets are 0, motion compensation unit 35 may skip the explicit weighted prediction that uses default weights or implicit weights. Also, if the offsets are 0 and calculated weights have no change, motion compensation unit 35 may skip the typical explicit weighted prediction that uses calculated weights and offsets.

Once the desired prediction data is identified by motion compensation unit 35, as described herein, video encoder 50 forms a residual video block by subtracting the prediction data from the original video block being coded. Adder 48 represents the component or components that perform this subtraction operation. Transform unit 38 applies a transform, such as a discrete cosine transform (DCT) or a conceptually similar transform, to the residual block, producing a video block comprising residual transform block coefficients. Transform unit 38, for example, may perform other transforms, such as those defined by the H.264 standard, which are conceptually similar to DCT. Wavelet transforms, integer transforms, sub-band transforms or other types of transforms could also be used. In any case, transform unit 38 applies the transform to the residual block, producing a block of residual transform coefficients. The transform may convert the residual information from a pixel domain to a frequency domain.

Quantization unit 40 quantizes the residual transform coefficients to further reduce bit rate. The quantization process may reduce the bit depth associated with some or all of the coefficients. For example, a 9-bit value may be rounded down to an 8-bit value during quantization. In addition, quantization unit 40 may also quantize the different offsets for cases where offset is used.

Following quantization, entropy coding unit 46 entropy codes the quantized transform coefficients. For example, entropy coding unit 46 may perform content adaptive variable length coding (CAVLC), context adaptive binary arithmetic coding (CABAC), or another entropy coding methodology. Following the entropy coding by entropy coding unit 46, the encoded video may be transmitted to another device or archived for later transmission or retrieval. The coded bitstream may include entropy coded residual blocks, motion vectors for such blocks, and other syntax such as the syntax described herein.

Inverse quantization unit 42 and inverse transform unit 44 apply inverse quantization and inverse transformation, respectively, to reconstruct the residual block in the pixel domain, e.g., for later use as the reference block in the manner described above. Adder 51 adds the reconstructed residual block to the motion compensated prediction block produced by motion compensation unit 35 to produce a reconstructed video block for storage in memory 34. The reconstructed video block may be used by motion estimation unit 32 and motion compensation unit 35 as a reference block to inter-encode a block in a subsequent video frame.

Figure 3:
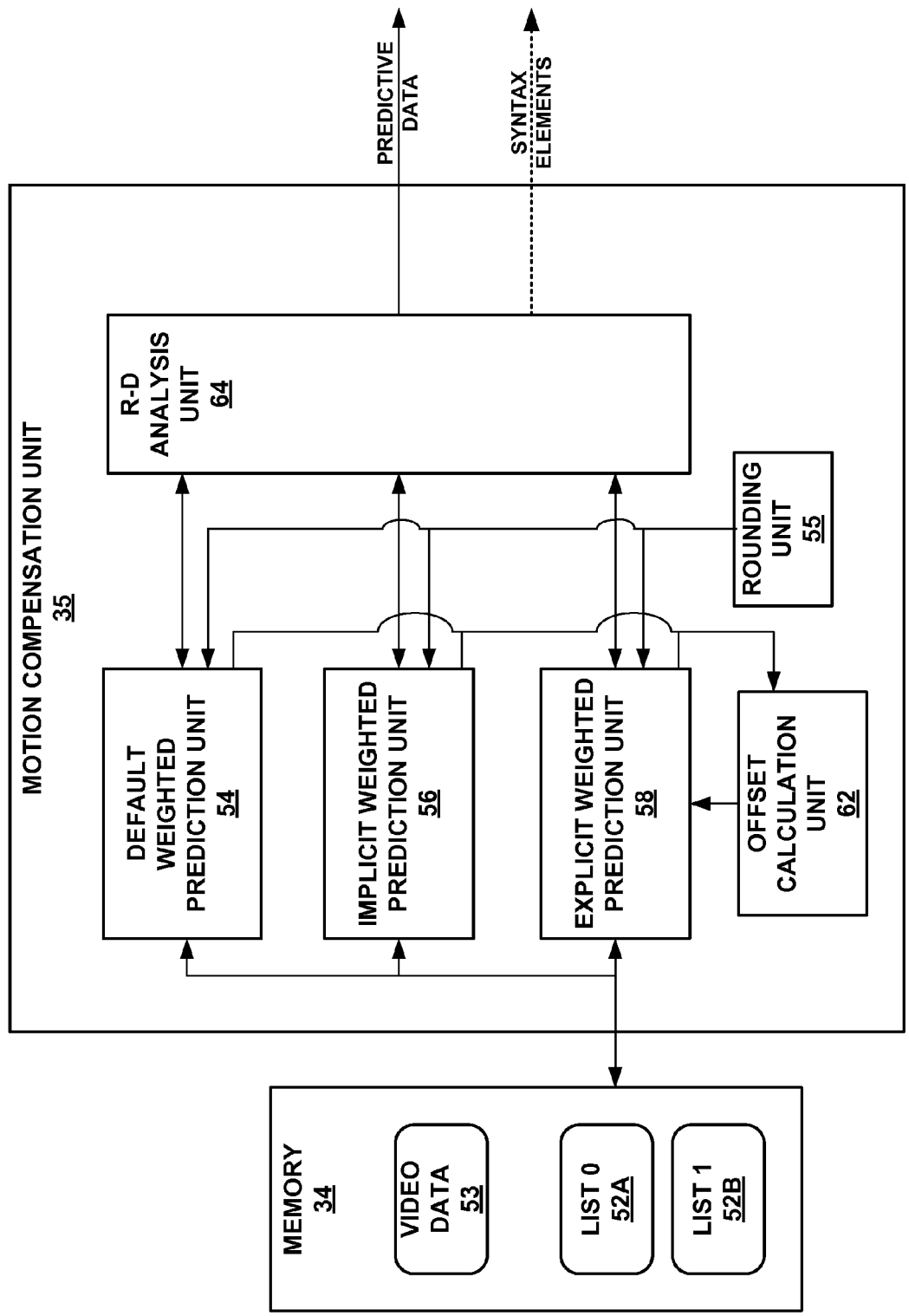
FIG. 3 is a block diagram illustrating an example of a motion compensation unit in more detail.

FIG. 3 is a block diagram illustrating an example of motion compensation unit 35 of FIG. 2 in more detail. As shown in the example of FIG. 3, motion compensation unit 35 couples to memory 34, which stores first and second sets of coded units or reference frames as list 0 52A and list 1 52B. In addition, memory 34 may store the current video data 53 coded. Memory 34 may comprise a shared memory structure, or possibly several different memories, storage units, buffers, or other types of storage that facilitates storage of any data discussed herein. List 0 52A and list 1 52B are data associated with two different predictive units, e.g., data from two different frames or slices or macroblocks, in accordance with bi-directional prediction. Again, bi-directional prediction is not necessarily limited to any prediction directions, and thus list 0 52A and list 1 52B may store data from two previous frames or slices, two subsequent frames or slices, or one previous frame or slice and one subsequent frame or slice. Furthermore, in some cases, list 0 52A and/or list 1 52B could each include data associated with multiple frames, slices or macroblocks. List 0 52A and/or list 1 52B are simply two different sets of possible predictive data, and each list may include one frame or slice, or several frames, slices or macroblocks in any direction relative to the current video block being encoded.

As shown in FIG. 3, motion compensation unit 35 includes a default weighted prediction unit 54, an implicit weighted prediction unit 56, and an explicit weighted prediction unit 58. Units 54, 56 and 58 respectively perform default weighted prediction, implicit weighted prediction, and explicit weighted prediction as described herein. Rate-distortion (R-D) analysis unit 64 may select weighted prediction data among these possibilities, and may implement techniques of this disclosure to facilitate the selection process.

Motion compensation unit 35 also includes a rounding unit 55 that causes one or more of units 54, 56 and 58 to generate both rounded and unrounded versions of the respective weighted prediction data. Again, by eliminating rounding, weighted prediction data may be improved in some contexts.

In addition, motion compensation unit 35 includes an offset calculation unit 62, which calculates offset. According to ITU-T H.264/MPEG-4 AVC coding format, offset is only allowed in explicit weighted prediction. Therefore, in order to consider offset in the context of default weighted prediction or implicit weighted prediction, the weights determined by default weighted prediction unit 54 or implicit weighted prediction unit 56 may be forwarded to explicit weighted prediction unit 58 along with offset determined by offset calculation unit 62. In this way, explicit weighted prediction unit 58 can exploit the ITU-T H.264/MPEG-4 AVC coding format by adding offset to default weighted prediction data or implicit weighted prediction data for consideration by R-D analysis unit 64. In this case, explicit weighted prediction unit 58 generates not only the normal explicit weighted prediction data, but also prediction data that uses the weights determined by default weighted prediction unit 54 or implicit weighted prediction unit 56 in conjunction with offset determined by offset calculation unit 62.

Offset calculation unit may calculate offset as a difference between an average of video block values of a block being coded and an average of video block values of the prediction block. Offset may be calculated for luma video blocks, and in some cases, offset may be calculated for luma video blocks and for chroma video blocks.

R-D analysis unit 64 may analyze the different weighted predictive data, and may select the weighted predictive data that generates the best results in terms of quality, or in terms of rate and distortion. R-D analysis unit 64 outputs the selected weighted predictive data, which may be subtracted from the video block being coded via adder 48 (FIG. 2). Syntax elements may be used to inform a decoder of the manner or method that should be used to generate the weighted predictive data. The syntax elements, for example, may indicate whether or not rounding was used, and may indicate whether default, implicit or explicit weighted prediction should be used. If explicit weighted prediction should be used, the syntax elements may further identify the weight factors and the offset, which again may be weight factors and offset associated with explicit weighted prediction, or may be weight factors that were actually defined by default weighted prediction unit 54 or implicit weighted prediction unit 56 with the addition of offset from offset calculation unit 62.

Figure 4:
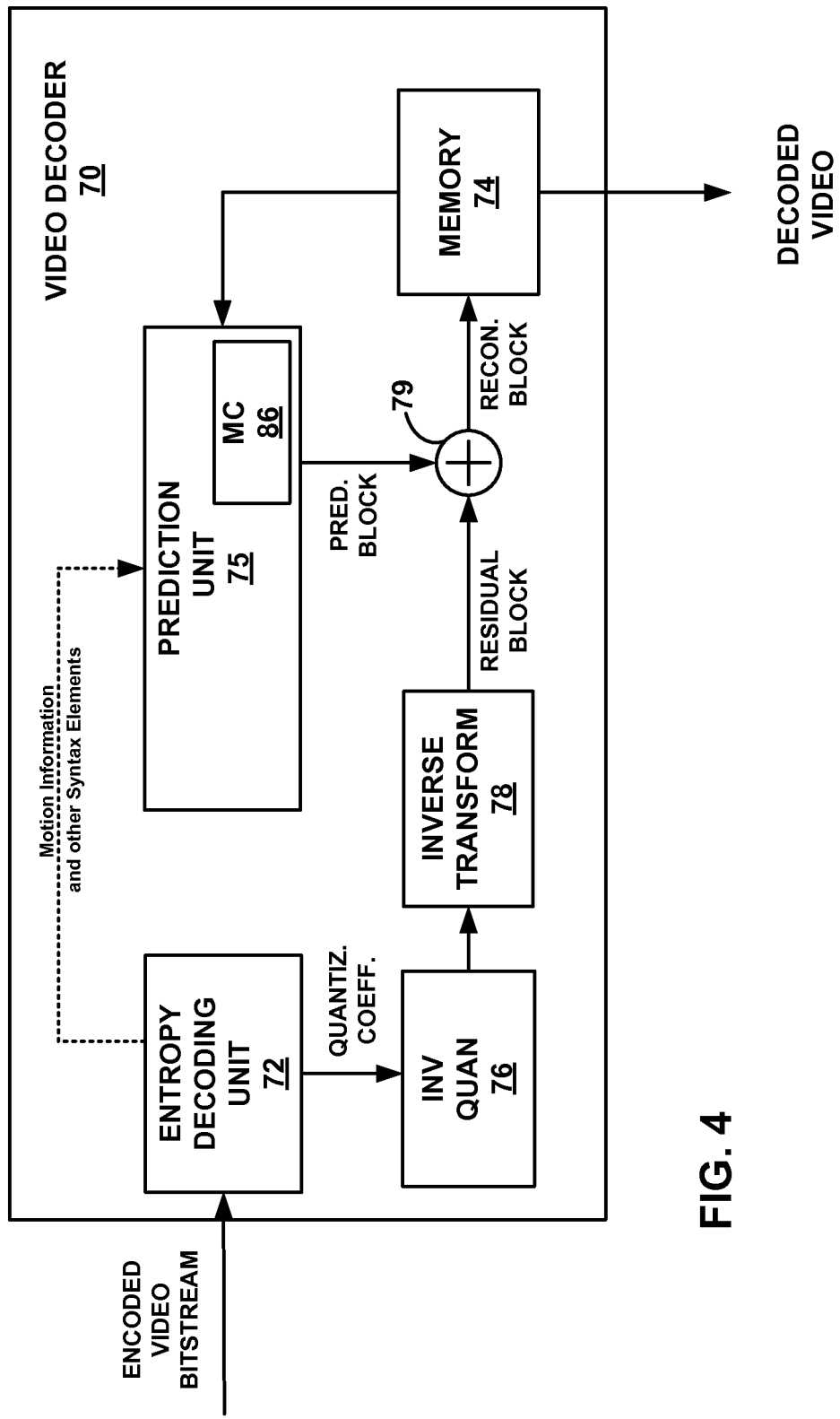
FIG. 4 is an example of a video decoder that may perform offset techniques consistent with this disclosure.

FIG. 4 is a block diagram illustrating an exemplary video decoder 70, which may perform the reciprocal decoding techniques to the encoding techniques described above. Video decoder 70 may include an entropy decoding unit 72, a prediction unit 75, an inverse quantization unit 76, an inverse transform unit 78, a memory 74 and adder 79. Prediction unit 75 may include a motion compensation (MC) unit 88, as well as spatial prediction components, which are not shown for simplicity and ease of illustration.

Video decoder 70 may receive encoded video data, and one or more syntax elements that indicate whether a rounding adjustment was used to encode the encoded video data. MC unit 86 of prediction unit 75 may generate weighted prediction data that depends on two or more lists of data, as described herein. In accordance with this disclosure, the weighted prediction data does not include the rounding adjustment if the one or more syntax elements indicate that the rounding adjustment was not used to encode the encoded video data. Video decoder 70 can decode the video data using the weighted prediction data, e.g., by invoking adder 79 to add the weighted prediction data (e.g., a prediction block) to residual data (e.g., a residual block).

In general, entropy decoding unit 72 receives an encoded bitsteam and entropy decodes the bitstream to generate quantized coefficients, motion information and other syntax. The motion information (e.g., motion vectors) and other syntax are forwarded to prediction unit 75 for use in generating the predictive data. Prediction unit 75 performs bi-directional prediction consistent with this disclosure, avoiding rounding adjustments in some cases, and possibly implementing default, implicit or explicit weighted prediction according to the received syntax elements. The syntax elements may identify the type of weighted prediction that to be used, coefficients and offset if explicit weighted prediction to be used, and whether rounding adjustments should be used in the decoding.

The quantized coefficients are sent from entropy decoding unit 72 to inverse quantization unit 76, which performs inverse quantization. Inverse transform unit 78 then inverse transforms the de-quantized coefficients back to the pixel domain to generate a residual block. Adder 79 combines the prediction data (e.g., a prediction block) generated by prediction unit 75 with the residual block from inverse transform unit 78 to create a reconstructed video block, which may be stored in memory 74 and/or output from video decoder 70 as decoded video output.

Figure 5:
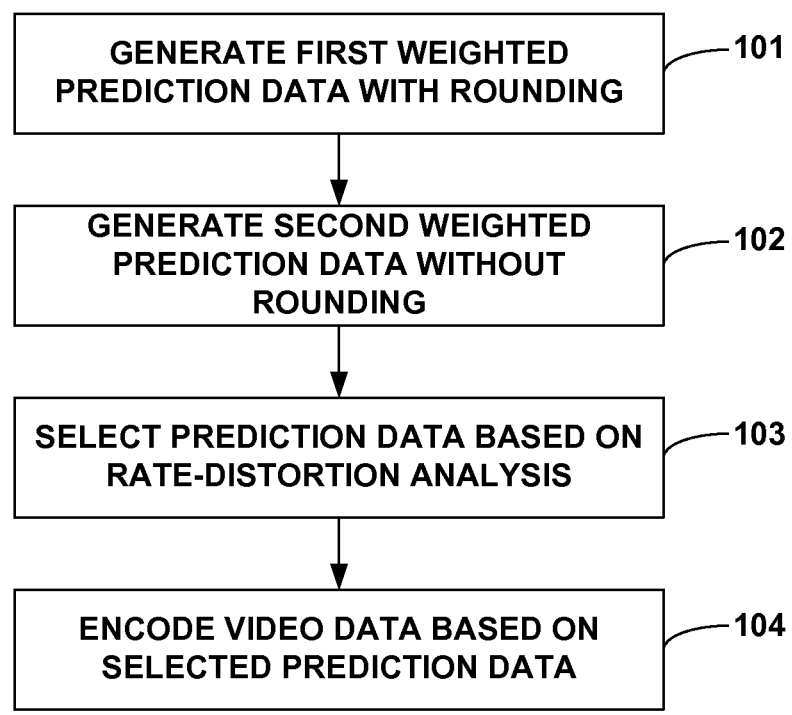
FIG. 5 is a flow chart illustrating an exemplary process performed by a video encoder consistent with this disclosure.

FIG. 5 is a flow chart illustrating an exemplary process performed by a video encoder consistent with this disclosure. FIG. 5 will be described from the perspective of video encoder 50 of FIG. 2. As shown in FIG. 5, motion compensation unit 35 generates first weighted prediction data that includes rounding (101), and generates second weighted prediction data that does not include rounding (102). Motion compensation unit 35 then selects prediction data from the first and second weighted prediction data based on a rate-distortion analysis (103). In particular, motion compensation unit 35 may determine cost metrics for the first and second weighted prediction data that quantify and balance the encoding rate and the encoding quality associated with the first and second weighted prediction data, and may select the prediction data with the lowest cost. Video encoder 50 can then encode video data based on the selected prediction data (104). For example, video encoder 50 may invoke adder 48 to subtract the selected prediction data from the video data being coded, and then invoke transform unit 38 for transform, quantization unit 40 for quantization and entropy coding unit 46 for entropy coding of quantized and transformed residual coefficients. In this case, motion compensation unit 35 may generate one or more syntax elements to indicate whether or not rounding was used for the prediction data, and may forward such syntax elements to entropy coding unit 46 for inclusion in the coded bistream.

Figure 6:
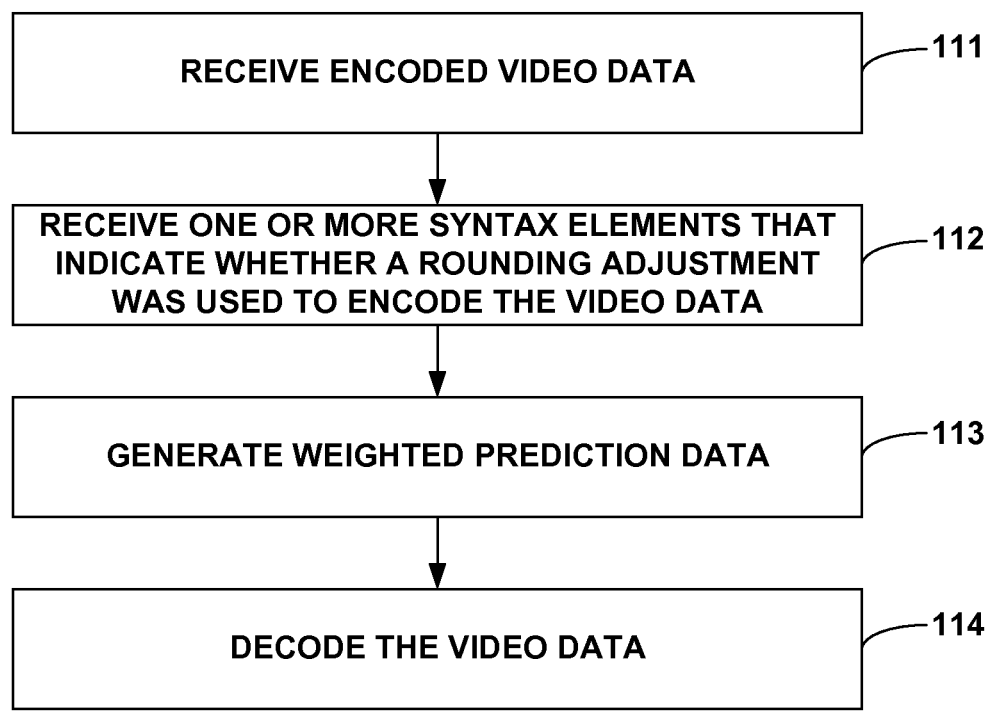
FIG. 6 is a flow chart illustrating an exemplary process performed by a video decoder consistent with this disclosure.

FIG. 6 is a flow chart illustrating an exemplary process performed by a video decoder consistent with this disclosure. FIG. 6 will be described from the perspective of video decoder 70 of FIG. 4. As shown in FIG. 6, video decoder receives encoded video data (111), and receives one or more syntax elements that indicate whether a rounding adjustment was used to encode the video data (112). In particular, entropy decoding unit 72 may receive an encoded bitstream that includes the video data and the one or more syntax elements. Following entropy decoding, entropy decoding unit 72 may output the video data as quantized transform coefficients, which are inverse quantized by unit 76 and inverse transformed by unit 78. Entropy decoding unit 72 may output syntax elements to prediction unit, which includes the one or more syntax elements that indicate whether a rounding adjustment was used to encode the video data, motion vectors and possibly other syntax.

Prediction unit 75 invokes motion compensation unit 86 for block based predictive decoding. In doing so, motion compensation unit 86 generates weighted prediction data based on the syntax (113). Accordingly, if the one or more syntax elements indicate that a rounding adjustment was used, then motion compensation unit 86 generates weighted prediction data that includes the rounding adjustment. However, if the one or more syntax elements indicate that a rounding adjustment was not used, then motion compensation unit 86 generates weighted prediction data that lacks the rounding adjustment. Video decoder 70 can then decode the video data using the weighted prediction data (114). In particular, video decoder 70 may invoke adder 79 to combine weighted prediction data (e.g., a prediction block) with residual video data (e.g., a residual block) in order to generate a reconstruction of the video data (e.g., a reconstructed video block).

Figure 7:
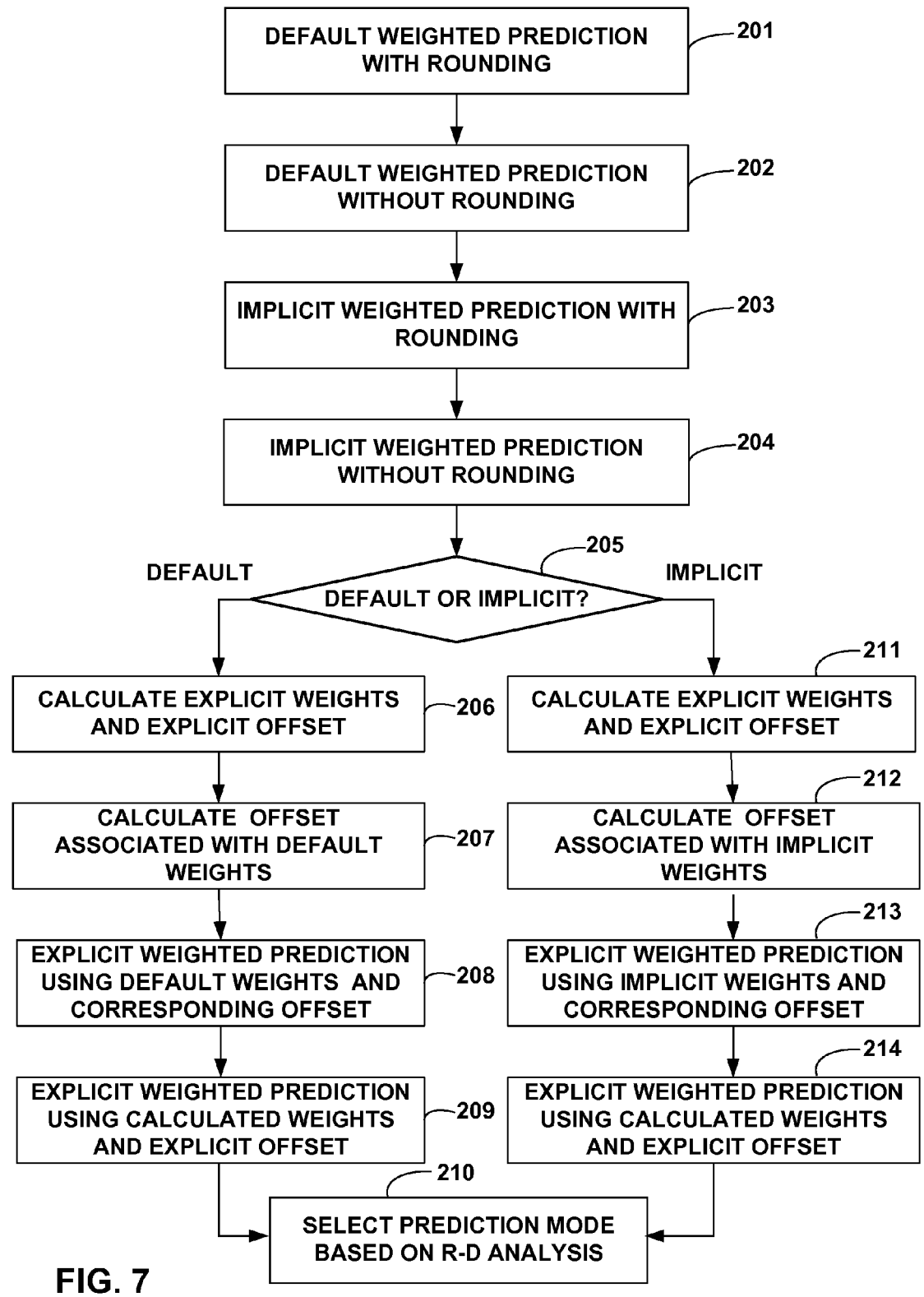
FIG. 7 is a flow chart illustrating another exemplary process performed by a video encoder consistent with this disclosure.

FIG. 7 is a flow chart illustrating another exemplary process performed by a video encoder consistent with this disclosure. FIG. 7 will be described from the perspective of motion compensation unit 35 of FIG. 3, which may form part of video encoder 50 of FIG. 2. As shown in FIG. 7, default weighted prediction unit 54 performs default weighted prediction with rounding (201) and performs default weighted prediction without rounding (202). Rounding unit 55 may be invoked to define such rounding or lack thereof. Implicit weighted prediction unit 56 then performs implicit weighted prediction with rounding (203) and performs implicit weighted prediction without rounding (204). Again, rounding unit 55 may be invoked to define such rounding or lack thereof.

As explained above, default weighted prediction refers to weighted prediction in which the weight factors associated with two or more different lists are pre-defined by some default setting. Default weighted prediction, in some cases, may assign equal weightings to each of the lists. Implicit weighted prediction refers to weighted prediction in which the weight factors associated with two or more different lists are defined based on some implicit factors associated with the data. For example, implicit weight factors may be defined by the relative temporal positions of the data in the two different lists relative to the data being predictively coded.

R-D analysis unit 64 selects either the default weighted prediction or the implicit weighted prediction (205). In particular, R-D analysis unit 64 may select either the default weighted prediction or the implicit weighted prediction based on the quality and coding rate associated with the different version of the prediction data. For example, R-D analysis unit 64 may consider the similarity of the different version of the prediction data relative to the video block being coded, and may select the version that is closest.

If R-D analysis unit 64 selects the default weighted prediction ("DEFAULT" 205), explicit weighted prediction unit 58 may be invoked to calculate explicit weighted prediction data and compare such data to explicit weighted prediction data that uses the default weights. As noted, this allows for offset in the context of default weights. Accordingly, the explicit weighted prediction can be used as a mechanism to provide different offsets to data that would otherwise be defined by default or implicit weighted prediction. As outlined above, explicit weighted prediction refers to weighted prediction in which the weight factors are dynamically defined as part of the coding process, and encoded into the bitstream. Explicit weighted prediction is different than default weighted prediction and implicit weighted prediction in this respect, e.g., explicit weighted prediction results in weight factors that are encoded as part of the bitstream whereas default and implicit weighted prediction define weight factors that are either pre-defined or determined by the decoder without the weight factors being in the bitstream.

In particular, explicit weighted prediction unit 58 may calculate explicit weights and explicit offset (206) using conventional explicit weighted prediction defined by ITU-T H.264. In order to calculate the explicit weights, for example, explicit weighted prediction unit 58 may apply a least mean squared (LMS) algorithm in order to solve the explicit weighted prediction equations listed above for both weights and offsets. In addition, explicit weighted prediction unit 58 may calculate offset associated with the default weights (207). Offset calculation unit 62 may be invoked by explicit weighted prediction unit 58 in order to calculate the offset. In particular, offset calculation unit 62 may calculate a given offset as the average difference between pixel values of the video data being coded and the given version versions of weighted prediction data.

Explicit weighted prediction unit 58 can then generate two different versions of prediction data. In particular, explicit weighted prediction unit 58 may perform explicit weighted prediction using default weights and the corresponding offset (208), and may also perform explicit weighted prediction using calculated weights and the corresponding explicit offset (209). These two different versions of explicit weighted prediction data (one being calculated according to normal explicit weighted prediction and the other being calculated using default weights with the addition of offset) and the default weighted prediction with or without rounding can then be sent to R-D analysis unit 64. R-D analysis unit 64 may select the prediction mode based on an R-D analysis (210). In particular, R-D analysis unit 64 may select between these two different versions of explicit weighted prediction data (one being calculated according to normal explicit weighted prediction and the other being calculated using default weights with the addition of offset). R-D analysis unit 64 may consider the similarity of the different version of the prediction data relative to the video block being coded, and may select the version that is closest.

A similar process occurs with respect to implicit weighted prediction data when the implicit weighted prediction data is selected relative to the default weighted prediction data. That is, if R-D analysis unit 64 selects the implicit weighted prediction ("IMPLICIT" 205), explicit weighted prediction unit 58 may be invoked to calculate explicit weighted prediction data and compare such data to explicit weighted prediction data that uses the implicit weights. This allows for offset in the context of implicit weights. In particular, explicit weighted prediction unit 58 may calculate explicit weights and explicit offset (211) using conventional explicit weighted prediction defined by ITU-T H.264. In addition, explicit weighted prediction unit 58 may calculate offset associated with the implicit weights (212). Offset calculation unit 62 may be invoked by explicit weighted prediction unit 58 in order to calculate the offsets as described herein.

Explicit weighted prediction unit 58 can then generate two different versions of prediction data. In this case, explicit weighted prediction unit 58 may perform explicit weighted prediction using implicit weights and the corresponding offset (213), and may also perform explicit weighted prediction using calculated weights and the corresponding explicit offset (214). These two different versions of explicit weighted prediction data (one being calculated according to normal explicit weighted prediction and the other being calculated using implicit weights with the addition of offset) and the implicit weighted prediction with or without rounding can then be sent to R-D analysis unit 64. R-D analysis unit 64 may select the prediction mode based on an R-D analysis. In particular, R-D analysis unit 64 may select between these two different versions of explicit weighted prediction data (one being calculated according to normal explicit weighted prediction and the other being calculated using implicit weights with the addition of offset). R-D analysis unit 64 may consider the similarity of the different version of the prediction data relative to the video block being coded, and may select the version that is closest.

The techniques of this disclosure may be implemented in a wide variety of devices or apparatuses, including a wireless handset, and integrated circuit (IC) or a set of ICs (i.e., a chip set). Any components, modules or units have been described provided to emphasize functional aspects and does not necessarily require realization by different hardware units. The techniques described herein may also be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset.

If implemented in software, the techniques may be realized at least in part by a computer-readable medium comprising instructions that, when executed in a processor, performs one or more of the methods described above. The computer-readable medium may comprise a computer-readable storage medium and may form part of a computer program product, which may include packaging materials. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code or instructions may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video codec. Also, the techniques could be fully implemented in one or more circuits or logic elements.

The disclosure also contemplates any of a variety of integrated circuit devices that include circuitry to implement one or more of the techniques described in this disclosure. Such circuitry may be provided in a single integrated circuit chip or in multiple, interoperable integrated circuit chips in a so-called chipset. Such integrated circuit devices may be used in a variety of applications, some of which may include use in wireless communication devices, such as mobile telephone handsets.

Various embodiments of the invention have been described. These and other embodiments are within the scope of the following claims.

The invention claimed is:

1. A method of encoding video data, the method comprising:
receiving a current video block;
determining a first prediction block from a reference frame in a first list;
determining a second prediction block from a reference frame in a second list;
generating a weighted prediction data that depends on at least the two prediction blocks from the reference frames in the two or more lists of data and includes at least two offsets and a rounding adjustment, wherein generating the weighted prediction data comprises:
left-shifting a sum of the at least two offsets by a rounding adjustment to generate a first intermediate value;
summing the product of the first prediction block by a first weighting factor, the product of the second prediction block by a second weighting factor, and two raised to the rounding adjustment to generate a second intermediate value; and
right-shifting the sum of the first intermediate value and the second intermediate value by the rounding adjustment plus one to generate the weighted prediction data;
determining a residual block as a difference between the current video block and the weighted prediction data;
transforming the residual block to generate a residual transform coefficient block;
quantizing the residual transform coefficient block to generate quantized residual coefficients; and
entropy coding the quantized residual coefficients to produce an encoded video bitstream.

2. The method of claim 1, the method being executable on a wireless communication device, wherein the device comprises:
a memory configured to store video data;
one or more processors configured to execute instructions to process the video data stored in said memory; and
a transmitter configured to transmit the encoded video bitstream.

3. The method of claim 2, wherein the wireless communication device is a cellular telephone and the encoded video bitstream is transmitted by the transmitter and modulated according to a cellular communication standard.

4. A method of decoding video data, the method comprising:
receiving an encoded video bitstream;
entropy decoding the encoded video bitstream to generate quantized residual coefficients;
inverse transforming the quantized residual coefficients to generate a residual block;
determining a first prediction block form a reference frame in a first list;
determining a second prediction block from a reference frame in a second list;
generating a weighted prediction data that depends on at least the two prediction blocks from the reference frames in the two or more lists of data and includes at least two offsets and a rounding adjustment, wherein generating the weighted prediction data comprises:
left-shifting a sum of the at least two offsets by a rounding adjustment to generate a first intermediate value;
summing the product of the first prediction block by a first weighting factor, the product of the second prediction block by a second weighting factor, and two raised to the rounding adjustment to generate a second intermediate value; and
right-shifting the sum of the first intermediate value and the second intermediate value by the rounding adjustment plus one to generate the weighted prediction data;
adding the residual block and the weighted prediction data to obtain a reconstructed block; and
outputting the reconstructed block as decoded video data.

5. The method of claim 4, the method being executable on a wireless communication device, wherein the device comprises:
a memory configured to store video data;
one or more processors configured to execute instructions to process the video data stored in said memory; and
a receiver configured to receive the encoded video bitstream.

6. The method of claim 5, wherein the wireless communication device is a cellular telephone and the encoded video bitstream is received by the receiver and modulated according to a cellular communication standard.

7. An apparatus for encoding video data, the apparatus comprising:
a memory that stores the video data and two or more lists of data used to predictively encode the video data; and
one or more processors configured to:
receive a current video block;
determine a first prediction block form a reference frame in a first list;
determine a second prediction block from a reference frame in a second list;
generate a weighted prediction data that depends on at least the two prediction blocks from the reference frames in the two or more lists of data and includes at least two offsets and a rounding adjustment, wherein, to generate the weighted prediction data, the one or more processors are configured to:
left-shift a sum of the at least two offsets by a rounding adjustment to generate a first intermediate value;
sum the product of the first prediction block by a first weighting factor, the product of the second prediction block by a second weighting factor, and two raised to the rounding adjustment to generate a second intermediate value; and
right-shift the sum of the first intermediate value and the second intermediate value by the rounding adjustment plus one to generate the weighted prediction data, wherein the one or more processors is further configured to:
determine a residual block as a difference between the current video block and the weighted prediction data;
transform the residual block to generate a residual transform coefficient block;
quantize the residual transform coefficient block to generate quantized residual coefficients; and entropy code the quantized residual coefficients to produce an encoded video bitstream.

8. The apparatus of claim 7, wherein the apparatus is a wireless communication device, further comprising:
a transmitter configured to transmit the encoded video bitstream.

9. An apparatus for decoding video data, the apparatus comprising:
a memory that stores the video data and two or more lists of data used to predictively decode the video data; and
one or more processors configured to:
receive an encoded video bitstream;
entropy decode the encoded bitstream to generate quantized residual coefficients;
inverse transform the quantized residual coefficients to generate a residual block;
determine a first prediction block form a reference frame in a first list;
determine a second prediction block from a reference frame in a second list;
generate a weighted prediction data that depends on at least the two prediction blocks from the reference frames in the two or more lists of data and includes at least two offsets and a rounding adjustment, wherein, to generate the weighted prediction data, the one or more processors are configured to:
left-shift a sum of the at least two offsets by a rounding adjustment to generate a first intermediate value;
sum the product of the first prediction block by a first weighting factor, the product of the second prediction block by a second weighting factor, and two raised to the rounding adjustment to generate a second intermediate value; and
right-shift the sum of the first intermediate value and the second intermediate value by the rounding adjustment plus one to generate the weighted prediction data,
wherein the one or more processors is further configured to:
add the residual block and the weighted prediction data to obtain a reconstructed block; and
output the reconstructed block as decoded video data.

10. The apparatus of claim 9, wherein the apparatus is a wireless communication device, further comprising:
a receiver configured to receive the encoded video bitstream.

11. The apparatus of claim 9, further comprising:
a display configured to display the decoded video data.

12. A device for coding video data, the device comprising:
means for generating weighted prediction data that depends on first and second prediction blocks obtained from reference frames from two or more lists of data and includes at least two offsets and a rounding adjustment,
means for receiving a current video block;
means for determining a residual block as a difference between the current video block and the weighted prediction data;

means for transforming the residual block to generate a residual transform coefficient block;
means for quantizing the residual transform coefficient block to generate quantized residual coefficients; and
means for entropy coding the quantized residual coefficients to produce an encoded video bitstream, wherein the means for generating the weighted prediction data comprises:
means for left-shifting a sum of the at least two offsets by a rounding adjustment to generate a first intermediate value;
means for summing the product of the first prediction block by a first weighting factor, the product of the second prediction block by a second weighting factor, and two raised to the rounding adjustment to generate a second intermediate value; and
means for right-shifting the sum of the first intermediate value and the second intermediate value by the rounding adjustment plus one to generate the weighted prediction data.

13. A non-transitory computer-readable storage medium having stored thereon instructions that when executed cause one or more processors of a video coder to:
receive a current video block;
determine a first prediction block form a reference frame in a first list;
determine a second prediction block from a reference frame in a second list;
generate a weighted prediction data that depends on at least the two prediction blocks from the reference frames in the two or more lists of data and includes at least two offsets and a rounding adjustment, wherein the instructions that cause the one or more processors to generate the weighted prediction data comprise instructions that cause the one or more processors to:
left-shift a sum of the at least two offsets by a rounding adjustment to generate a first intermediate value;
sum the product of the first prediction block by a first weighting factor, the product of the second prediction block by a second weighting factor, and two raised to the rounding adjustment to generate a second intermediate; and
right-shift the sum of the first intermediate value and the second intermediate value by the rounding adjustment plus one to generate the weighted prediction data;
determine a residual block as a difference between the current video block and the weighted prediction data;
transform the residual block to generate a residual transform coefficient block;
quantize the residual transform coefficient block to generate quantized residual coefficients; and
entropy code the quantized residual coefficients to produce an encoded video bitstream.

14. The non-transitory computer-readable storage medium of claim 13, wherein the instructions further cause the processor to decode the encoded video bitstream.

* * * * *